United States Patent [19]

Chiba et al.

[11] Patent Number: 4,760,113
[45] Date of Patent: Jul. 26, 1988

[54] PROCESS FOR CONTINUOUSLY PRODUCING A HIGH-MELT VISCOELASTIC ETHYLENE-PROPYLENE COPOLYMER

[75] Inventors: Hiromasa Chiba; Shunji Kawazoe; Takahiro Oka, all of Ichiharashi, Japan

[73] Assignee: Chisso Corporation, Osaka, Japan

[21] Appl. No.: 942,796

[22] Filed: Dec. 17, 1986

[30] Foreign Application Priority Data

Dec. 17, 1985 [JP] Japan .................. 60-283728

[51] Int. Cl.⁴ ........................... C08F 297/08
[52] U.S. Cl. ................... 525/53; 525/247; 525/323
[58] Field of Search ........................... 525/53

[56] References Cited

U.S. PATENT DOCUMENTS

| | | | |
|---|---|---|---|
| 3,378,607 | 4/1968 | Jones et al. | 525/53 |
| 3,642,951 | 2/1972 | Shirai et al. | 525/323 |
| 4,066,718 | 1/1978 | Saito et al. | 525/53 |
| 4,339,557 | 7/1982 | Hasuo et al. | 525/323 |
| 4,499,247 | 2/1985 | Chiba et al. | 526/65 |

FOREIGN PATENT DOCUMENTS

| | | | |
|---|---|---|---|
| 56-53118 | 5/1981 | Japan | 526/65 |
| 2094319 | 9/1982 | United Kingdom | 526/65 |

*Primary Examiner*—Edward J. Smith
*Attorney, Agent, or Firm*—Fred Philpitt

[57] ABSTRACT

A continuous polymerization process for producing a high-melt viscoelastic ethylene-propylene copolymer by the use of Ziegler-Natta catalyst, which process make it possible to stably produce an ethylene-propylene block copolymer having superior physical properties suitable to sheet molding and blow molding and capable of producing large-size molded products is provided, which process comprises (a) feeding propylene and ethylene in a weight proportion of ethylene in the total of propylene and ethylene of 0–5% into 3 or more polymerization vessels among 4 or more polymerization vessels connected in series, to carry out continuous polymerization step (i) and successively feeding ethylene and propylene in a weight proportion of ethylene in the total of ethylene and propylene of 10–100% into one or more polymerization vessels, to carry out continuous polymerization process (ii);
(b) feeding the total quantity of the catalyst only to the first polymerization vessel; (c) feeding the total quantity of hydrogen substantially only to the first polymerization vessel; and (d) making the quantity of polymer obtained in step (i) 60–95 weight % based on the total polymerization quantity.

2 Claims, 1 Drawing Sheet

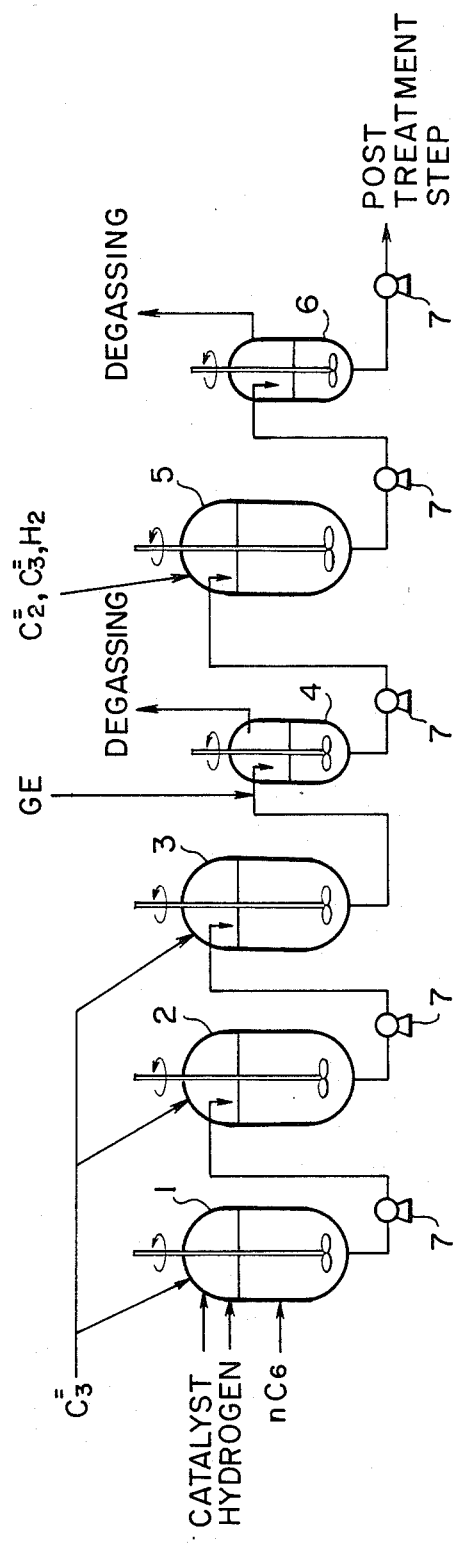

PROCESS FOR CONTINUOUSLY PRODUCING A HIGH-MELT VISCOELASTIC ETHYLENE-PROPYLENE COPOLYMER

BACKGROUND OF THE INVENTION

1. Field of the Invention

This invention relates to a process for continuously producing a high-melt viscoelastic ethylene-propylene copolymer. More particularly it relates to the process wherein a polymerization step (i) using propylene as a main component is carried out in the first polymerization vessel to the third polymerization vessel or more among 4 or more polymerization vessels connected in series, and a polymerization step (ii) using a relatively large quantity of ethylene is then carried out in the fourth polymerization vessel et seq.

The copolymer obtained according to the process of the present invention has a superior high-impact strength to that of similar products obtained according to conventional process, and is suitable for post-processed sheet and for blow molding.

2. Description of the Related Art

Sheets produced by process-molding known general-purpose polypropylene, when used for post-processing, have the following various drawbacks:

(1) The sheets rapidly sag at the time of molding for its conversion; the ranges of processing conditions are narrow; and the molding efficiency is inferior. Besides, (2) in the case of broad sheets, the above sagging is to a large extent; the thickness of post-processed products is liable to be ununiform; and accumulated wrinkles occur. Thus it is possible to produce only small molded products.

On the other hand, in the case where known general-purpose polypropylene is processed according to blow molding process, the following problems have been raised:

(1) Since sagging of parison at the time of molding is so large that the thickness of the resulting molded products is ununiform. Thus, blow molding process can be applied only to small molded products.

(2) If a high molecular weight polypropylene is used for preventing the above sagging, dangers of causing inferior melt fluidity, increase in the load and increase in the energy loss at the time of molding, and other mechanical troubles not only increase, but also the surface-roughening of practically molded products is so notable that the commodity value thereof is lost.

In order to improve the above sheet-moldability and blow moldability at the time of use of polypropylene, for example Japanese patent publication No. Sho 47-80614/1972 and Japanese patent application laid-open No. Sho 50-8848/1975 disclose blending of a low density polyethylene with polypropylene. However, molded products obtained by using such a blend are liable to cause surface-roughening, and in order to prevent the surface-roughening, powerful kneading is required at the time of melting so that the practice of these inventions is restricted in the aspect of choice of kneader and power consumption. Besides, the resulting invented products also have a problem of reduction in stiffness. Further, Japanese patent application laid-open Nos. Sho 53-91954/1978, Sho 57-185336/1982, Sho 57-187337/1972 and Sho 58-7439/1983 propose a process of kneading polypropylenes having different molecular weights by means of a granule-making machine or the like. However, the resulting molded products obtained from the blends of these inventions are liable to cause more surface-roughening than that in the case of the molded products from the above-mentioned blends of low density polyethylene; thus the practice of these inventions is restricted in the aspect of kneading process and choice of molecular weight difference.

In order to solve the above-mentioned problems relative to the moldability of general-purpose polypropylene, a number of processes of broadening the molecular weight distribution of the objective products according to a multi-stage polymerization process have been proposed (e.g. Japanese patent application laid-open Nos. Sho 57-185304/1982, Sho 57-190006/1982, Sho 58-7405/1983, Sho 58-7409/1983, Sho 59-172507/1984, etc.). However, according to most of Examples of these inventions, propylenes having different molecular weights are produced at a multi-stage according to batch polymerization process, but the so-called idletime takes place which has essentially nothing to do with the polymerization reaction itself, such as times required for feeding raw material, withdrawing product, etc.; thus as a commercial production process, the above process has a drawback that it has a low productivity per unit equipment.

Further, the above inventions of Japanese patent application laid-open No. Sho 57-185304/1982 et seq, refer also to a continuous polymerization process, and when the order of the stepwise production is directed to (a) a combination of a high molecular weight product→a low molecular weight product, it is possible to achieve the necessary molecular weight difference only by adding hydrogen at the later stage of the multi-stage polymerization; hence the case (a) is preferred as process, whereas to the contrary when the order is directed to (b) a combination of a low molecular weight product→ a high molecular weight product, it is required to remove unnecessary hydrogen by pressure drop or degassing of the inside of the vessel holding the polymerization reaction mixture after preparation of the low molecular weight product and before preparation of the high molecular weight product; thus it is described therein that the processability in the case (b) is inferior to that in the case (a).

However, according to a tracing experiment of the present inventors directed to the above process, in the case of production in the order of a high molecular weight product→a low molecular weight product (the above references describing that the former order is preferred), if the melt flow rate (hereinafter referred to as MFR) value of the high molecular weight part is low, a problem is raised that its measurement is difficult or impossible so that there is an obstacle in the aspect of operation control (Note: measurement of viscosity [$\eta$] is possible, but since a long time is required for the measurement, such a process is not practical as an operation control means).

Further, it has been found that polypropylene produced at a multi-stage in the order of a high molecular weight→a low molecular weight has an abnormally large difference between the MFR value of powder prior to granulation and the MFR value of pellet obtained by granulation (note: the MFR value of powder is lower); thus there are problems in the aspect of control of the differences between the molecular weights at the respective stages and control of the MFR value of the resulting product.

On the other hand, crystalline polypropylene has superior physical properties in the aspect of stiffness, heat resistance, etc., whereas it has a problem in that its high-impact strength and particularly its low temperature high-impact strength are low; thus in this respect, the range of its practical uses has been restricted. In order to overcome this drawback, a number of processes of block-copolymerizing ethylene or another α-olefin with propylene have been proposed (e.g. Japanese patent application laid-open Nos. Sho 50-142652/1975, Sho 52-8094/1977, Sho 57-34112/1982, etc.). However, according to such a process, polymerization (1) of monomers composed mainly of propylene is carried out, followed by removing hydrogen and then carrying out polymerization (2) of monomers containing a relatively large quantity of ethylene, at that time a device for broadening the molecular weight distribution being carried out.

In general, when a multi-stage continuous polymerization process is employed in a block copolymerization process, there occur distributions in the retention times of the respective catalyst particles at the respective stages (which distribution is assumed to be close to a complete mixing vessel distribution); thus the resulting product corresponds to an aggregate of polymer particles wherein the proportions of polypropylene portion and polyethylene portion (which contains a relatively large quantity of ethylene) contained therein vary each time, and hence there occurs a drawback in the aspect of product quality due to the above-mentioned ununiformity.

Particularly in the process of the present invention described later in detail, since molecular weight differences are imparted at the respective stages in the multi-stage polymerization step (i) wherein monomers composed mainly of propylene are polymerized, if a known art is employed as it is, molecular weight differences between the respective polymer particles are enlarged as compared with the case of conventional block copolymerization so that the problem due to the uniformity becomes more serious.

A number of processes for overcoming the above drawbacks of the multi-stage continuous polymerization process according to the prior art have been proposed. For example according to Japanese patent application laid-open Nos. Sho 58-48916/1983 , Sho 55-116716/1980, Sho 58-69215/1983, etc., a slurry having left a propylene polymerization part (polymerization step 1) is subjected to classification by means of a cyclone and the resulting fine particles are again returned to the propylene polymerization part. However, since the classification of polymer particle sizes does not always accord with the retention time distribution, the effectiveness of the process is insufficient. Further, according to Japanese patent application laid-open Nos. Sho 57-195718/1982 and Sho 58-29811/1983, catalyst feed to a polymerization vessel and slurry withdrawal from the vessel are intermittently carried out, whereby the catalyst portion entering an ethylene polymerization part (polymerization step 2) is reduced during a short period of the retention time.

However, such a process has a drawback that the polymerization reaction is unstable.

Further, certain processes similar to an embodiment (6) of the present invention described later have been proposed wherein a slurry having left a propylene polymerization part is treated with an electron-donative compound, etc. whereby the slurry is withdrawn in a short retention time and the catalyst particles are selectively inactivated.

For example, Japanese patent application laid-open Nos. Sho 57-145115/1982 and Sho 55-115417/1980 propose various electron-donative compounds, but compounds in the range of those used in Examples are insufficient for achieving the object of the present invention described later.

In view of the above-described drawbacks of the prior art directed to a multi-stage continuous polymerization process for producing a propylene-ethylene block copolymer, the present inventors have made extensive research in order to find a polymerization process having overcome the drawbacks, and as a result have found that when (1) polymerization using propylene as a main component is carried out in the initial three polymerization vessels or more among four polymerization vessels or more connected in series (ethylene content in monomers fed: 0 to 5% by weight), and successively polymerization using a relatively large quantity of ethylene is carried out in one or more remaining vessels (ethylene content in monomers fed: 10 to 100% by weight), and (2) the total quantities of a catalyst used and hydrogen as a molecular weight modifier are fed to the first polymerization vessel and the catalyst and hydrogen (excluding their quantities consumed midway) are successively transferred to the second polymerization vessel et seq together with the reaction mixture (slurry), then it is possible to produce an ethylene-propylene block copolymer having a broad polymerization degree distribution stably and with a good reproducibility; thus it is possible to substantially overcome the above-mentioned drawbacks of the prior art.

As apparent from the foregoing, an object of the present invention is to provide a continuous polymerization process for producing a high-melt viscoelastic ethylene-propylene copolymer, which process makes it possible to stably produce an ethylene-propylene block copolymer having superior physical properties suitable to sheet molding and blow molding and capable of producing large-size molded products. Another object of the present invention is to provide a copolymer produced according to the above-mentioned process. Other objects of the present invention will be apparent from the succeeding description.

SUMMARY OF THE INVENTION

The present invention has the following main constitution (1) and constitutions as embodiments (2)~(6):

(1) In the process for continuously producing an ethylene-propylene copolymer by the use of a Ziegler-Natta type catalyst, a process for continuously producing a high-melt viscoelastic ethylene-propylene copolymer, which process comprises (a) feeding propylene or propylene and ethylene in a proportion by weight of ethylene in the total weight of ethylene and propylene of 0 to 5% by weight into three or more polymerization vessels comprising the first polymerization vessel to the third one among four or more polymerization vessels connected in series, to carry out a continuous polymerization step (i) using propylene as a main component, and successively feeding ethylene or ethylene and propylene in a proportion by weight of ethylene in the total weight of ethylene and propylene of 10 to 100% by weight into one or more polymerization vessels not employed in said step (i), to carry out a continuous polymerization step (ii)

using a relatively large quantity of ethylene as compared with that used in said step (i);

(b) feeding the total quantity of a catalyst used into the first vessel, the fed catalyst successively passing through the second vessel et seq together with the resulting polymerization reaction mixture, while the polymers polymerized in the polymerization vessels at the respective polymerization stages are added to and formed on the same catalyst solids, and thereafter being discharged from the final vessel;

(c) using hydrogen gas as a molecular weight modifier in the continuous polymerization step (i) using propylene as a main component, the total quantity of said hydrogen gas being fed into the first vessel and a remainder of hydrogen gas after its consumption in the respective prior vessels being transferred into the second vessel et seq together with the resulting polymerization reaction mixture (slurry); and (d) making the quantity of the polymer obtained in the polymerization step (i) 60 to 95% by weight based on the total polymerization quantity.

(2) A continuous production process according to item (1) wherein, in said continuous polymerization step (i) using propylene as a main component, the polymerization quantities in the respective vessels of three or more polymerization vessels comprising the first vessel to the third vessel fall in the following expression (1):

$$0.70 \times \frac{Q_T}{n} \leq Q_i \leq 1.30 \frac{Q_T}{n} \quad (1)$$

wherein $$\sum_{i=1}^{n} Q_i = Q_T = 1,$$

$Q_T$: the total polymerization quantity per unit time in the continuous polymerization step (i) is made 1.
i: a polymerization vessel i-numbered from the first.
$Q_i$: polymerization quantity per unit time in the polymerization vessel i-numbered from the first.
n: the number of polymerization vessels used in the continuous polymerization step (i) using propylene as a main component.

(3) A continuous production process according to item (1) wherein, in the continuous polymerization step (i) using propylene as a main component, the molecular weights of the polymers formed in the respective polymerization vessels, in terms of MFR values, fall in the range of the following expression (2):

$$\log \frac{MFR_i}{MFR_{i+1}} \geq 1.0 \quad (2)$$

wherein
$MFR_i$: MFR of the polymer formed in the polymerization vessel i-numbered from the first.
$MFR_{i+1}$: MFR of the polymer formed in the polymerization vessel i+1-numbered from the first.

(4) A continuous production process according to item (1) wherein, in the continuous polymerization step (i) using propylene as a main component, the polymerization pressures in each of the second polymerization vessel et seq are kept not so as to be lower by 2 Kg/cm²G or more, than the polymerization pressure in the just prior polymerization vessel.

(5) A continuous production process according to item (1) wherein, in the continuous polymerization step (i) using propylene as a main component, the polymerization temperatures in each of the second polymerization vessel et seq are kept not so as to be higher by 10° C. or more, than the polymerization temperature in the just prior polymerization vessel.

(6) A continuous production process according to item (1) wherein as an organoaluminum compound component (B) to be combined with a titanium-containing solid component (A) constituting the Ziegler-Natta type catalyst, a compound expressed by the formula $AlR^2{}_m X_{3-m}$ wherein $R^2$ represents a hydrocarbon group of 1 to 20 carbon atoms, X represents a halogen atom and m represents a number of $3 \geq m > 1.5$;

said continuous polymerization step (i) is carried out in the presence of an inert solvent or liquid propylene; and a glycol ether (C) is continuously added to the polymerization reaction mixture (slurry) after completion of the step (i) so as to give a ratio (mol/atom) of said (C) to Ti in said (A) of 0.01 to 1.0, to carry out said continuous polymerization step (ii).

BRIEF DESCRIPTION OF THE DRAWING

The accompanying drawing shows a flowsheet of a polymerization apparatus employed in the process of the present invention wherein numerals 1, 2 and 3 each represent the first polymerization vessel to the third one (each capacity: 150 l) in the continuous polymerization step (i) using propylene as a main component; 5 represents a polymerization vessel (capacity: 150 l) in the continuous polymerization step (ii) using a relatively large quantity of ethylene,
4,6: pressure drop vessel (capacity: 100 l)
7: pump,
GE: glycol ether,
$C_2$--, $C_3$--: ethylene, propylene
$nC_6$: n-hexane.

DETAILED DESCRIPTION OF PREFERRED EMBODIMENTS

The constitution and effectiveness of the present invention will be described in detail.

The catalyst used in the present invention may be the so-called Ziegler-Natta type catalyst and has no particular limitation, but a catalyst based on a combination of a titanium compound with an organoaluminum compound is preferably used. As the titanium compound, catalysts generally used for stereoregular polymerization of propylene may be preferably used such as titanium trichloride composition obtained by reducing $TiCl_4$ with hydrogen, metal aluminum, etc., a product activated by further milling the titanium trichloride composition by means of ball mill, vibration mill, etc., a product obtained by further treating the activated product with an electron donor, a titanium trichloride composition obtained by reducing $TiCl_4$ with an organoaluminum and successively subjecting the resulting reduction material to various treatments (such as a titanium trichloride composition subjected to crystalline transformation by heating in $TiCl_4$, a titanium trichloride highly activated by treatment with an electrondonative compound or an electron-acceptable compound, etc.), the so-called supported type catalyst obtained by having $TiCl_4$ supported on a carrier such as $MgCl_2$, etc.

As the organoaluminum compound used in the present invention, compounds expressed by the formula $AlR_n R'_{n'} X_{3-(n+n')}$ may be preferably used, wherein R and R' each represent a hydrocarbon group such as alkyl group, aryl group, etc.; X represents a halogen atom of F, Cl, Br or I; and n and n' each represent an optional number of $0 < n+n' \leq 3$. Concrete examples thereof are trialkylaluminums or dialkylaluminum monohalides, and these may be used singly or in admixture of two or more kinds. Further, an electron donor generally used as a third component may be used in combination with the above titanium compound and organoaluminum compound.

As the polymerization form, slurry polymerization using a hydrocarbon such as propane, hexane, heptane, octane, benzene, toluene, etc. as solvent or bulk polymerization using propylene as solvent may be employed.

As the polymerization vessel, a tank type one may be preferably employed. In the polymerization step (i) using propylene as a main component, three or more polymerization vessels are connected in series, and as to the transfer of the resulting polymerization mixture (slurry) between the polymerization vessels, a portion of the slurry (liquid phase) is continuously withdrawn and continuously transferred to the next polymerization vessel.

In the polymerization step (ii) containing a relatively large quantity of ethylene, a first vessel for continuously receiving the polymerization reaction mixture sent from the final polymerization vessel of the first step is included, and preferably one or more polymerization vessels of tank type are employed, to carry out continuous polymerization feeding definite proportions of ethylene and propylene.

In the process of the present invention, the catalyst used is fed only to the first polymerization vessel throughout the first step and the second step. The thus fed catalyst solids are then successively passed through the second vessel, the third vessel et seq together with other polymerization reaction mixture, and then withdrawn from the final polymerization vessel in the form in which the solid particles are coated with polymers formed thereon in the respective polymerization vessels.

If a fresh catalyst is fed to the second vessel et seq, a polymer having a far different MFR value from that of the polymer formed at the first vessel is formed on the solid particles of the catalyst; hence it is difficult to uniformly blend these polymers even by way of granulation process carried out after formation of the resulting product, and the molded product from such a product causes inferior appearance such as fish eyes, etc.

In the process of the present invention, hydrogen is used as a molecular weight modifier, and this hydrogen is fed only to the first polymerization vessel throughout the total processes in the same manner as in the case of the catalyst. The feed to the first vessel may be carried out either in gas phase or liquid phase inside the vessel.

However, the feed of hydrogen to the second vessel et seq from the prior vessel is carried out in the form in which hydrogen is dissolved in the above polymerization reaction mixture i.e. in a solution state. Thus, when hydrogen is fed to the liquid phase (polymerization reaction mixture) in the first vessel, it is necessary to use care lest undissolved hydrogen should be transferred to the second vessel in the form of bubbles as it is. If hydrogen involved in the liquid phase in the form of bubbles is sent to the next vessel (this possibility may also occur in the second vessel et seq depending on agitating condition), then the difference between the hydrogen concentration in the vessel and that in the prior vessel becomes uncertain so that the molecular weight of the polymer formed in the prior vessel and that in the vessel both become small or uncertain. As a result, the molecular weight difference inside the finally obtained ethylene-propylene copolymer cannot be sufficiently broad.

The number of the polymerization vessels (connected in series) used in the polymerization step (i) according to the process of the present invention is necessary to be three or more. If the number is two or less, it is impossible to impart the above-mentioned molecular weight difference i.e. sufficiently broaden the molecular weight distribution of the copolymer product.

In the process of the present invention, propylene, ethylene and solvent are fed to the respective polymerization vessels depending on their needs. Supplement of solvent is carried out for adequately keeping the slurry concentration in the respective polymerization vessels depending on the quantity of polymer increased. By carrying out the polymerization step (i) as above, the molecular weights of the polymers formed in the respective vessels stepwise increase from the first vessel to the second and from the second vessel to the third, and it is possible to impart a sufficient molecular weight difference as a whole.

In the polymerization step (i) of the present invention, the quantity polymerized per unit time is preferred to fall in the range expressed by the following expression (1):

$$0.70 \times \frac{Q_T}{n} \leq Q_i \leq 1.30 \frac{Q_T}{n} \qquad (1)$$

wherein $$\sum_{i=1}^{n} Q_i = Q_T = 1$$

$Q_T$: the total polymerization quantity per unit time in the continuous polymerization step (i) is made 1.
i: a polymerization vessel i-numbered from the first.
$Q_i$: polymerization quantity per unit time in the polymerization vessel i-numbered from the first.
n: the number of polymerization vessels used in the continuous polymerization step (i) using propylene as a main component.

Thus, it is preferred that based on the case where equal quantities of polymers are prepared in the respective polymerization vessels, concrete polymerization quantities in the respective vessels be adjusted to within the range of a variation width of ±30% thereof. In the case where either one or all of the above $Q_i$ values are outside the above range, the curve of the polymerization degree distribution inside the final product polymer is far displaced from the normal distribution curve; thus there may occur a case where the copolymer aimed in the present invention cannot be obtained.

The polymerization temperature employed in the continuous polymerization step (i) using propylene as a main component has no particular limitation, but it is preferably in the range of 20° to 100° C., more preferably in the range of 40° to 80° C.

However, as to the polymerization temperature, it is necessary that in the prior and posterior polymerization vessels connected in series, the temperature of the posterior polymerization vessel should not be higher by 10° C. or more, than that of the just prior polymerization vessel. If the polymerization temperature of the posterior polymerization vessel is higher by 10° C. or more, than that of the prior polymerization vessel, the molecular weight of polypropylene prepared in the posterior polymerization vessel is too much reduced to make it impossible to sufficiently broaden the molecular weight distribution of the final product.

To the contrary, as to the difference between the polymerization temperature of the just prior polymerization vessel and that of the just posterior polymerization vessel, it does not matter if both the temperature are the same or the temperature in the posterior vessel is lower than that in the prior vessel. Because, the process of the present invention is directed to a process for producing polypropylene wherein the latter the polymerization vessel, the higher the polymerization degree of polypropylene.

Thus, in order to more broaden the molecular weight distribution in the present invention, this can be more easily effected by making the temperature of the first polymerization vessel highest and successively lowering the temperatures of the second polymerization vessel et seq.

The polymerization pressure in the polymerization step (i) using propylene as a main component in the present invention has no particular limitation, but usually a pressure of the atmospheric pressure to 50 Kg/cm$^2$ G may be employed. The polymerization pressures of the respective polymerization vessels connected in series in the process of the present invention may be the same or different. However, it is necessary that in the case of the prior and posterior polymerization vessels connected in series, the polymerization pressure of the posterior polymerization vessel be not lower by 2 Kg/cm$^2$ or more, than that of the just prior polymerization vessel. If the pressure is lower by 2 Kg/cm$^2$ or more, the molecular weight of polypropylene prepared in the polymerization vessel is lower than the desired molecular weight, to make it difficult to sufficiently broaden the molecular weight distribution of the final product.

As apparent from the foregoing, in the polymerization step (i) using propylene as a main component, of the present invention, successive elevation of the pressures of the respective polymerization vessels connected in series, from the first vessel to the subsequent vessel, makes it easy to adjust the molecular weight distribution of the final product to a broader one.

In the process of the present invention, the average retention time of the reaction mixture inside the respective polymerization vessels connected in series has no particular limitation, but usually the time is in the range of 30 to 10 hours. Further, the above various polymerization conditions i.e. pressure, temperature, retention time, etc. are adequately chosen depending on the aimed quality of polypropylene, catalyst and others, whereby it is possible to easily achieve the objects of the present invention. Besides, the slurry transfer between the polymerization vessels connected in series may be carried out by way of conventional pumping, pressure difference transportation, etc. and has no particular limitation.

The ethylene-propylene copolymer obtained as above of the present invention usually has a MFR of 0.01 to 100, but particularly for sheet molding or blow molding, those having a MFR value of 0.05 to 10, preferably 0.10 to 5.0 are used.

In addition, the molecular weight differences among polypropylenes prepared in the respective polymerization vessels connected in series, in the polymerization step (i), as expressed in terms of MFR value, are preferred to be in the range of the following expression (2):

$$\log \frac{MFR_i}{MFR_{i+1}} \geqq 1.0 \quad (2)$$

wherein
$MFR_i$: MFR of polymer formed in the polymerization vessel i-numbered from the first.
$MFR_{i+1}$: MFR of polymer formed in the polymerization vessel i+1-numbered from the first.

If the numeral value on the left side of the above expression (2) is less than 1.0, the high-melt viscoelasticity aimed in the present invention is liable to be insufficient. Further, the upper limit of the numeral value has no particular limitation, but it is difficult to make the value 3.0 or more, in concrete embodiments of the present invention.

The composition of the monomers fed in the polymerization step (i) is in the range of the following equation:

$$\frac{\text{Ethylene }(C_2{=})}{\text{Ethylene }(C_2{=}) + \text{Propylene }(C_3{=})} = 0\sim 5\% \text{ by weight.}$$

If the quantity of ethylene used exceeds 5% by weight, the finally obtained copolymer has a tendency that physical properties such as stiffness, heat resistance, etc. characteristic of polypropylene become inferior. Further, as to the monomers, 1-butene, 4-methylpentene-1, styrene, non-conjugated dienes, etc. may be added as a third component besides ethylene in a quantity of 0 to 10% by weight based on the weight of propylene.

The proportion of the polymerization quantity in the polymerization step (i) of the present invention is in the range of 60 to 95% by weight, preferably 75 to 90% by weight based on the weight of the ethylene-propylene copolymer as the finally obtained product. If the proportion exceeds the upper limit, the polymerization of the polymerization step (i) brings about reduction in the stiffness of the product block copolymer, while if it is less than the lower limit, the polymerization makes improvement in the low-temperature high-impact strength insufficient.

The withdrawn slurry after completion of the polymerization step (i) of the present invention is continuously transferred into the first polymerization vessel of the polymerization step (ii) wherein the polymerization step (ii) containing a relatively large quantity of ethylene, of the present invention is carried out.

In the polymerization step (ii), ethylene is used in a quantity of at least twice (10% by weight) the quantity of ethylene used in the polymerization step (i). In the polymerization step (ii), use of two or more polymerization vessels is not indispensable, but if the polymerization quantity in the step (ii) is as considerably large as 20 to 40% by weight, provision of two or more polymerization vessels makes it possible to balance the quantities of polymers prepared among the respective polymerization vessels.

Further, in the polymerization step (ii), since the ethylene concentration in the fed monomers is much different from that in the step (i), the withdrawn slurry from the polymerization step (i) may be once received into a pressure drop vessel and subjected to degassing (removal of dissolved propylene, ethylene and hydrogen), followed by feeding the resulting slurry to the polymerization vessel of the polymerization step (ii). In the polymerization step (ii), polymerization is carried out in the same manner as in the polymerization step (i) except that monomers in a definite ratio by weight of ethylene/ethylene+propylene and necessary quantities of hydrogen and solvent are fed.

According to a preferred embodiment of the process of the present invention, a specified glycol ether (hereinafter referred to often as "additive C") may be added as a third component for catalyst in the polymerization step (ii). The object of the addition is directly to reduce the activity of the catalyst to which the component is added, to a considerable extent, and substantially to selectively inactivate short pass catalyst (catalyst having a high activity) and thereby homogenize the polymers formed in the second step.

Examples of the glycol ethers are ethylene glycol monoalkyl ethers, ethylene glycol dialkyl ethers, propylene glycol monoalkyl ethers and propylene glycol dialkyl ethers. Concrete examples thereof are ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, etc. Further, glycol condensates are illustrated. Examples thereof are diethylene glycol monoalkyl ethers, diethylene glycol dialkyl ethers, triethylene glycol monoalkyl ethers, triethylene glycol dialkyl ethers, tetraethylene glycol monoalkyl ethers, tetraethylene glycol dialkyl ethers, dipropylene glycol monoalkyl ethers, dipropylene glycol dialkyl ethers, tripropylene glycol monoalkyl ethers, tripropylene glycol dialkyl ethers, tetrapropylene glycol monoalkyl ethers, tetrapropylene glycol dialkyl ethers, polyethylene glycol monoalkyl ethers, polyethylene glycol dialkyl ethers, polypropylene glycol monoalkyl ethers, polypropylene glycol dialkyl ethers, etc., and as the alkyl group, linear chain hydrocarbons of 1 to 20 carbon atoms are exemplified. Further, glycol ethers obtained by reacting ethylene oxide and propylene oxide with a specified alcohol may also be used. These ethers (C) are used in a molar ratio of (C)/Ti in (A) ((A): Ti-containing catalyst component) of 0.01 to 1.0. Further, although the addition effect of glycol ethers varies depending on the kind thereof, it is preferred to add (C) so as to give a catalyst activity of 30 to 80% when the catalyst activity in the case where no glycol ether is added is made 100%. If its quantity added is too large, the effectiveness of inactivating the short pass catalyst is large, but reduction in the whole catalyst activity is also so large that such excess quantity is economically undesirable, and moreover, control of the ratio of the polymerization quantities in the polymerization steps (i) and (ii) is restricted. To the contrary, if the quantity of (C) is too small, the above selective inactivation effectiveness of the short pass catalyst is insufficient. The reason that the glycol ethers used in the present invention are notably effective as compared with so far known ketones, amines, amides, alkyl ethers, carboxylic acid esters, halogenated compounds, etc. has been unclarified, but it is presumed that the glycol ethers react with an organoaluminum compound (B) to form a complex insoluble in an inert solvent, which is difficult to react with the catalyst inside the polymer particles so that a function of preferentially inactivating the short pass catalyst is notably exhibited. Namely, the fact that a liquid complex insoluble in an inert solvent is formed and this complex has a viscosity due to which the complex is difficult to be easily impregnated into the inside of polymer particles, is presumed to constitute necessary conditions.

In the polymerization step (ii), the glycol ethers are preferred to be added to the above degassed slurry withdrawn from the step (i) in advance of initiating the polymerization of the polymerization step (ii), but the glycol ethers may be directly added to the polymerization vessel. The addition manner of the glycol ethers may be either continuous or intermittent, but in the latter case, the addition interval is made ⅛ or less of the retention time of the slurry inside the polymerization vessel in the polymerization step (ii). If the interval is so long, the effectiveness of the additive (C) is insufficient.

The general polymerization conditions of the polymerization step (ii) according to the process of the present invention are as follows:

Polymerization temperature: 20°–80° C., preferably 40°–70° C.,

Pressure: 0–50 Kg/cm$^2$G, and

Average retention time: 20 minutes–10 hours.

For controlling the molecular weight, hydrogen is usually used and its quantity used is 1 to 40% by mol in terms of gas phase concentration inside the polymerization vessel.

The proportions of monomers used are 10 to 100% by weight, preferably 20 to 70% by weight in terms of ratio by weight of ethylene to ethylene+propylene, and the polymerization quantity is 5 to 40% by weight, preferably 10 to 25% by weight based on the weight of the finally obtained ethylene-propylene block copolymer. Further, in this polymerization step (ii), too, it is possible to simultaneously use a small quantity of another α-olefin or non-conjugated diene, as in the case of the polymerization step (i).

The main effectiveness of the process of the present invention described in detail can be summarized as follows:

Firstly, since the ethylene-propylene copolymer according to the process of the present invention has a broader molecular weight distribution than that of conventional product, its fluidity at the time of extrusion molding is superior so that it is possible to increase the quantity extruded by means of an extruder and save the consumed power. Similarly, since the copolymer also has a characteristic that the fluidity at the time of injection molding is superior, excellent results are exhibited in the aspects of quality and processing efficiency of molded products obtained in the use applications in various molding fields. Secondly, the process of the present invention as a definite multi-stage polymerization process is broad in the operation conditions of the respective polymerization vessels so that control of the polymerization process and control of polymerization conditions can be very simply carried out.

As described above, according to the present invention, the above effectiveness which has been impossible to achieve according to the prior art could have been achieved by employing specified polymerization conditions and using an additive (as an embodiment).

The present invention will be described in more detail by way of Examples, but it should not be construed to be limited thereto.

The analyses and measurement methods in Examples were carried out as follows:

MFR (g/10 min.): ASTM D-1238, 230° C., 2.16 Kg load.

Ethylene content (wt. %): infrared absorption spectra method.

Polymerization ratio (wt/wt) of polymerization (i) to polymerization (ii):

Copolymers having the reaction ratio of ethylene/propylene varied were prepared in advance, and using the copolymers as standard samples, calibration curves were prepared according to infrared absorption spectra method, followed by obtaining the reaction quantity ratio of ethylene/propylene of the polymerization (ii) referring to the curve and further calculating the polymerization ratio from the ethylene quantity (as described above) in the total copolymer.

Calculation of MFRs of polymers formed in the respective polymerization vessels:

$MFR_1$: MFR of polymer formed in the first polymerization vessel. (*1)

$MFR_2$: MFR of polymer formed in the second polymerization vessel (*1)

$MFR_3$: MFR of polymer formed in the third polymerization vessel. (*1)

*1: Sampled and observed.

$MFR_{1+2}$: MFR of the total polymer formed in the first and second polymerization vessels.

$MFR_{1+2+3}$: MFR of the total polymer formed in the first, second and third polymerization vessels.

$W_1$: Proportion of the total polymer formed in the first polymerization vessel in the polymerization step (i). (*2)

$W_2$: Proportion of the total polymer formed in the second polymerization vessel in the polymerization step (i). (*2)

$W_3$: Proportion of the total polymer formed in the third polymerization vessel in the polymerization step (i). (*2)

$$W_1 + W_2 + W_3 = 1.0$$

*2: Ti content in polymer was analyzed according to fluorescent X-ray method and the proportion was calculated therefrom.

$MFR_2$ and $MFR_3$ were obtained according to the following relationship:

$$\log MFR_{1+2} = \frac{W_1}{W_1 + W_2} \log MFR_1 + \frac{W_2}{W_1 + W_2} \log MFR_2$$

$$\log MFR_{1+2+3} = \frac{W_1 + W_2}{W_1 + W_2 + W_3} \log MFR_{1+2} + \frac{W_3}{W_1 + W_2 + W_3} \log MFR_3$$

Measurement method of physical properties of sheet-molded product:

Young's modulus (Kgf/mm$^2$): ASTM D-882

Punching high-impact strength (Kgf/mm$^2$): ASTM D-781

Heating behavior: Chisso process (mentioned below)

In order to evaluate the heating vacuum properties of sheet in model manner, a sheet was fixed to a frame of 40 cm × 40 cm, followed by placing it in a thermostatic chamber at 200° C., to measure the following physical properties:

(a) Sag quantity of sheet at the initial period of heating (mm).

(b) Maximum reversion quantity (%): {1/150×(150-sag quantity at the time of maximum reversion (mm)×100)}

(c) Retention time since the time of maximum reversion till the time of initiation of re-sagging (sec.).

Sheet appearance: viewed by naked eyes.

EXAMPLE 1

(1) Catalyst preparation:

Hexane (6 l), diethylaluminum monochloride (DEAC) (5.0 mols) and diisoamyl ether (12.0 mols) were mixed at 25° C. for 5 minutes and the mixture was reacted at the same temperature for 5 minutes to obtain a reaction fluid (I) (molar ratio of diisoamyl ether/DEAC: 2.4). TiCl$_4$ (40 mols) was placed in a reactor purged with nitrogen gas and heated to 35° C., followed by dropwise adding thereto the total quantity of the above reaction fluid (I) over 180 minutes, thereafter keeping the mixture at the same temperature for 30 minutes, raising the temperature up to 75° C., further reacting it for one hour, cooling down to room temperature, removing the supernatant, and 4 times repeating a procedure of adding n-hexane (30 l) and removing the supernatant by decantation to obtain a solid product (II) (1.9 Kg).

The total quantity of this product (II) was suspended in n-hexane (30 l), followed by adding to the suspension, diisoamyl ether (1.6 Kg) and TiCl$_4$ (3.5 Kg) at room temperature (20° C.) over about 5 minutes, reacting the mixture at 65° C. for one hour, cooling the reaction fluid down to room temperature (20° C.), removing the supernatant and 5 times repeating a procedure of adding n-hexane (30 l), agitating for 15 minutes, allowing to stand still and removing the supernatant and drying under reduced pressure to obtain a solid product (III).

(2) Catalyst adjustment:

Into a 50 l capacity tank were fed n-hexane (40 l), diethylaluminum monochloride (850 g), the above solid product (360 g) and methyl p-toluylate (3.8 g), followed by feeding propylene gas at a rate of 180 g/H for 2 hours while keeping the mixture at 30° C. with stirring to carry out pretreatment.

(3) Polymerization process:

Polymerization was carried out by means of a polymerization apparatus shown in the accompanying drawing.

Into a polymerization vessel 1 were continuously fed n-hexane (26 l/H) and a catalyst slurry (120 ml/H). Propylene was fed to the respective polymerization vessels 1-3 while the temperature in these vessels was kept at 70° C. and the pressure was kept at 6 Kg/cm$^2$ G in the vessel 1, at 8 Kg/cm$^2$ G in the vessel 2 and at 10 Kg/cm$^2$ G in the vessel 3.

As to the hydrogen concentrations in the gas phase part of the polymerization vessels 1-3, when hydrogen was fed so that only the concentration in the vessel 1 could be 2.1% by mol, the concentrations in the vessels 2 and 3 were 0.41% by mol and 0.046% by mol. Further, the reaction quantities and the analytical values of MFR in the respective polymerization vessels were as shown in Table 1. In addition, the respective reaction fluids were withdrawn by means of control valves so that the fluid levels in the vessels 1-3 could be 80%.

The slurry containing polymer particles, withdrawn from the vessel 3 was degassed in a pressure drop vessel 4 at 60° C. and 0.5 Kg/cm² G and transferred into a polymerization vessel 5 by means of a pump. In the vessel 5, ethylene was fed at 600 g/H at 60° C. so as to give a hydrogen concentration in the gas phase part of the vessel of 10% by mol, and propylene and hydrogen were fed to the vessel so that the gas composition in the gas phase part in terms of ethylene/(ethylene +propylene) could be 0.40. The resulting slurry having left the vessel 5 is passed through a degassing vessel 6, followed by deactivating the catalyst with methanol and further passing through steps of neutralization with aqueous NaOH, water washing, separation and drying to obtain a white copolymer powder (about 6.5 Kg/H). Its analytical values are shown in Table 1.

(4) Granulation process and sheet-molding process:

To the white copolymer powder obtained above (15 Kg) were fed BHT® (2,6-t-butyl-p-cresol) (15 g), Irganox 1010® (tetrakis[methylene(3,5-di-t-butyl-4-hydrocinnamate]methane) (7.5 g) and calcium stearate (30 g), followed by granulating the mixture by means of a granulating machine of 40 mmφ and then extruding the granules by means of an extrusion molding machine of 50 mmφ at 225° C. into a sheet of 60 cm wide and 0.4 mm thick. Its physical properties were measured according to the above method. The results are shown in Table 2.

COMPARATIVE EXAMPLE 1

Example 1 was repeated except that the hydrogen concentrations in the gas phase of the respective polymerization vessels were made the same by feeding hydrogen to the respective polymerization vessels. The physical properties of the polymer in this case were notably inferior in the aspect of heating behavior of sheet.

COMPARATIVE EXAMPLES 2 AND 3

In Example 1, the third polymerization was omitted and also the polymerization pressure and the quantity of hydrogen were varied as indicated in Table 1-1. In the case of such a two-stage polymerization, although the MFR difference between the MFRs of polymers in the polymerization vessels and the rate of polymerization fell in the ranges of the present invention, the polymers were inferior in the aspect of heating behavior of sheet; thus the object of the present invention could not be achieved.

EXAMPLES 2, 3 AND 4

In Example 1, the polymerization temperature and polymerization pressure were varied as indicated in Table 1-1.

COMPARATIVE EXAMPLE 4

In Example 1, the pressure was varied as indicated in Table 1-2. Further, in order to make the polymerization proportions in the respective polymerization vessels fall in the ranges of the present invention, the fluid levels of the respective polymerization vessels were made 40% (in the case of polymerization vessel 1), 60% (in the case of polymerization vessel 2) and 80% (in the case of polymerization vessel 3). In the case where the pressure difference between the pressures inside the respective polymerization vessels falls outside the range of the present invention, it is difficult to obtain adequate MFR difference between the MFRs of polymers inside the respective polymerization vessels; thus the polymer was inferior in the aspect of heating behavior of sheet.

COMPARATIVE EXAMPLES 5 AND 6A

In Example 1, the polymerization quantities in the respective polymerization vessels were varied under the conditions indicated in Table 1-2. In the case where the polymerization proportions fell outside the ranges of the present invention, too, the resulting polymers were inferior in the aspect of heating behavior of sheet.

COMPARATIVE EXAMPLE 7

Example 1 was repeated except that the feed of the catalyst slurry was distributed to three polymerization vessels. The distribution ratio relative to the polymerization vessel 1, 2 and 3 were made 8:1:1, respectively. As to the physical properties of the resulting sheet, notable surface-roughening (FE) occurred. Further, notable reduction in the punching high-impact strength was also observed.

COMPARATIVE EXAMPLE 8

In Example 1, the polymerization temperature and pressure were varied as indicated in Table 1-2. Further, in order to make the polymerization proportions fall within the ranges of the present invention, the proportion of the fluid levels in the polymerization vessel 1, 2 and 3 was made 85%:65%:45%, respectively. In the case where the polymerization temperatures relative to the polymerization vessels fell outside the ranges of the present inventions, it was difficult to obtain adequate MFR difference between MFRs of the polymers in the polymerization vessels and the resulting polymer was inferior in the aspect of heating behavior of sheet.

EXAMPLE 5

In Example 1, methyl p-toluylate was fed to polymerization vessel 1 in a quantity of 1 g per g of the solid product in the catalyst slurry. Further, the quantity of the catalyst slurry fed was changed to 240 ml/H. As seen from Table 2-3, when this catalyst system was used, notable increase in Young's modulus and improvement in heating behavior were observed.

EXAMPLE 6

In Example 5, the polymerization temperature and pressure were varied as indicated in Table 2-3.

COMPARATIVE EXAMPLE 9

In Example 5, hydrogen was fed to the respective polymerization vessels. Heating behavior of sheet was notably inferior to those in Examples 5 and 6.

EXAMPLE 7

In Example 1, diethylene glycol dimethyl ether (a) was fed to the pressure drop vessel 5 in a quantity in terms of (a)/Ti (Ti: Ti mols contained in the solid catalyst) (ratio by mol) of 0.3, and further, the hydrogen concentration in the gas phase in the polymerization vessel 5 was made 2.0% by mol. As compared with Example 1, notable improvements in the soluble polymer and low-temperature punching high-impact strength were observed.

COMPARATIVE EXAMPLE 10

In Example 7, addition of diethylene glycol dimethyl ether was omitted. The sheet appearance was inferior (many occurrences of FE) and reduction in the punching high-impact strength was observed.

EXAMPLES 8 AND 9

In Example 7, the quantity of diethylene glycol dimethyl ether added was varied.

COMPARATIVE EXAMPLES 11 AND 12

In Example 7, the quantity of diethylene glycol dimethyl ether added was varied. In Comparative example 11, since the polymerizability of catalyst in polymerization vessel 4 lowered notably so that polymerization was stopped. In Comparative example 12, FE occurred although the extent was not so large as that in the case of Comparative example 10, that is, the sheet appearance was inferior.

EXAMPLES 10, 11, 12 AND 13

In Example 7, diethylene glycol dimethyl ether (a) was replaced by ethylene glycol monobutyl ether (b), tetraethylene glycol dimethyl ether (c), ethylene glycol monopropyl ether (d) or diethylene glycol dipropyl ether (e).

EXAMPLE 14

At the time of granulation in Example 1, a high pressure polyethylene (MFR: 0.5, LDPE) in a quantity of 1.5 Kg (13.5 Kg as a white copolymer powder) was added.

COMPARATIVE EXAMPLE 13

In Example 14, the white copolymer powder of Example 1 was replaced by that of Comparative example 1.

TABLE 1-1

| | Polymerization Conditions and Results | | | | | | |
|---|---|---|---|---|---|---|---|
| | Example 1 | Comp. ex. ① | → ② | → ③ | Example 2 | → 3 | → 4 |
| Polymerization vessel (1) | | | | | | | |
| Temperature °C. | 70 | 70 | 70 | 70 | 70 | 70 | 70 |
| Pressure kg/cm²G | 6 | 6 | 6 | 6 | 4 | 4 | 6 |
| $H_2$ conc. in gas phase mol % | 2.1 | 0.40 | 1.0 | 1.3 | 4.1 | 6.0 | 2.0 |
| $MFR_1$ g/10 min | 7.5 | 0.48 | 2.0 | 3.1 | 17.6 | 34.1 | 6.1 |
| Polymerization proportion wt % | 35 | 36 | 55 | 54 | 24 | 31 | 39 |
| Polymerization vessel (2) | | | | | | | |
| Temperature °C. | 70 | 70 | 70 | 70 | 70 | 60 | 70 |
| Pressure kg/cm²G | 8 | 8 | 8 | 10 | 8 | 8 | 6 |
| $H_2$ conc. in gas phase mol % | 0.41 | 0.40 | 0.12 | 0.11 | 0.35 | 0.49 | 0.41 |
| $MFR_2$ g/10 min | 0.45 | 0.39 | 0.08 | 0.05 | 0.40 | 0.36 | 0.39 |
| Polymerization proportion wt % | 33 | 33 | 45 | 46 | 35 | 34 | 33 |
| Polymerization vessel (3) | | | | | | | |
| Temperature °C. | 70 | 70 | — | — | 70 | 50 | 70 |
| Pressure kg/cm²G | 10 | 10 | — | — | 12 | 12 | 6 |
| $H_2$ conc. in gas phase mol % | 0.046 | 0.40 | — | — | 0.042 | 0.062 | 0.085 |
| $MFR_3$ g/10 min | 0.015 | 0.35 | — | — | 0.014 | 0.006 | 0.035 |
| Polymerization proportion wt % | 32 | 31 | — | — | 41 | 35 | 28 |
| log $MFR_1/MFR_2$ | 1.3 | 0.1 | 1.4 | 1.8 | 1.6 | 2.0 | 1.2 |
| log $MFR_2/MFR_3$ | 1.4 | 0.05 | — | — | 1.5 | 1.8 | 1.0 |
| Glycol ether (GE) | — | — | — | — | — | — | — |
| GE/Ti mol ratio | — | — | — | — | — | — | — |
| Polymerization vessel (4) | | | | | | | |
| $H_2$ conc. in gas phase mol % | 10 | 10 | 10 | 10 | 10 | 10 | 10 |
| $MFR_4$ g/10 min | 0.16 | 0.15 | 0.18 | 0.14 | 0.19 | 0.20 | 0.13 |
| Ethylene content wt % | 8.7 | 8.5 | 8.9 | 8.6 | 8.4 | 8.5 | 8.7 |
| Soluble polymer wt % | 5.2 | 5.5 | 5.9 | 5.3 | 5.0 | 5.6 | 5.0 |
| Polymerization proportion* wt % | 13.5 | 13.7 | 14.0 | 13.3 | 13.4 | 13.6 | 13.8 |

*Proportion based on the total polymerization quantity

TABLE 1-2

| | Polymerization Conditions and Results | | | | |
|---|---|---|---|---|---|
| | Comp. ex. ④ | → ⑤ | → ⑥ | → ⑦ | → ⑧ |
| Polymerization vessel (1) | | | | | |
| Temperature °C. | 70 | 70 | 70 | 70 | 45 |
| Pressure kg/cm²G | 8.5 | 6 | 4 | 6 | 4 |
| $H_2$ conc. in gas phase mol % | 1.2 | 1.4 | 5.0 | 2.6 | 3.6 |
| $MFR_1$ g/10 min | 2.6 | 3.5 | 26.5 | 9.5 | 2.0 |
| Polymerization proportion wt % | 40 | 48 | 18 | 28 | 24 |
| Polymerization vessel (2) | | | | | |
| Temperature °C. | 70 | 60 | 70 | 70 | 60 |
| Pressure kg/cm²G | 6.0 | 5 | 8 | 8 | 8 |
| $H_2$ conc. in gas phase mol % | 0.26 | 0.52 | 0.75 | 0.40 | 0.56 |
| $MFR_2$ g/10 min | 0.30 | 0.28 | 0.94 | 0.42 | 0.38 |
| Polymerization proportion wt % | 35 | 34 | 32 | 35 | 35 |
| Polymerization vessel (3) | | | | | |
| Temperature °C. | 70 | 50 | 70 | 70 | 75 |
| Pressure kg/cm²G | 3.5 | 4 | 12 | 10 | 12 |
| $H_2$ conc. in gas phase mol % | 0.09 | 0.18 | 0.073 | 0.054 | 0.088 |
| $MFR_3$ g/10 min | 0.054 | 0.021 | 0.048 | 0.017 | 0.061 |
| Polymerization proportion wt % | 25 | 18 | 50 | 37 | 41 |

TABLE 1-2-continued

| Polymerization Conditions and Results | Comp. ex. ④ | → ⑤ | → ⑥ | → ⑦ | → ⑧ |
|---|---|---|---|---|---|
| log MFR$_1$/MFR$_2$ | 0.9 | 1.1 | 1.5 | 1.4 | 0.85 |
| log MFR$_2$/MFR$_3$ | 0.7 | 1.1 | 1.3 | 1.4 | 0.79 |
| Glycol ether (GE) | — | — | — | — | — |
| GE/Ti mol ratio | — | — | — | — | — |
| Polymerization vessel (4) | | | | | |
| H$_2$ conc. in gas phase mol % | 10 | 10 | 10 | 10 | 10 |
| MFR$_4$ g/10 min | 0.16 | 0.13 | 0.15 | 0.20 | 0.18 |
| Ethylene content wt % | 8.5 | 8.6 | 8.8 | 8.4 | 8.3 |
| Soluble polymer wt % | 5.9 | 5.6 | 5.8 | 5.3 | 5.0 |
| Polymerization proportion wt % | 13.4 | 13.5 | 14.0 | 13.0 | 12.9 |

TABLE 1-3

| Polymerization Conditions and Results | Example 5 | → 6 | Comp. ex. ⑨ | Example 7 | Comp. ex. ⑩ |
|---|---|---|---|---|---|
| Polymerization vessel (1) | | | | | |
| Temperature °C. | 70 | 70 | 70 | 70 | 70 |
| Pressure kg/cm$^2$G | 6 | 4 | 6 | 6 | 6 |
| H$_2$ conc. in gas phase mol % | 5.9 | 14.5 | 0.55 | 5.1 | 5.1 |
| MFR$_1$ g/10 min | 14.8 | 62 | 0.38 | 25.2 | 25.5 |
| Polymerization proportion wt % | 33 | 32 | 35 | 35 | 35 |
| Polymerization vessel (2) | | | | | |
| Temperature °C. | 70 | 60 | 70 | 70 | 70 |
| Pressure kg/cm$^2$G | 8 | 8 | 8 | 8 | 8 |
| H$_2$ conc. in gas phase mol % | 0.65 | 1.0 | 0.55 | 0.72 | 0.73 |
| MFR$_2$ g/10 min | 0.55 | 0.45 | 0.39 | 1.1 | 1.1 |
| Polymerization proportion wt % | 34 | 34 | 32 | 33 | 33 |
| Polymerization vessel (3) | | | | | |
| Temperature °C. | 70 | 50 | 70 | 70 | 70 |
| Pressure kg/cm$^2$G | 10 | 12 | 10 | 10 | 10 |
| H$_2$ conc. in gas phase mol % | 0.069 | 0.10 | 0.55 | 0.085 | 0.083 |
| MFR$_3$ g/10 min | 0.009 | 0.006 | 0.37 | 0.037 | 0.035 |
| Polymerization proportion wt % | 33 | 34 | 33 | 32 | 32 |
| log MFR$_1$/MFR$_2$ | 1.4 | 2.1 | 0.0 | 1.4 | 1.4 |
| log MFR$_2$/MFR$_3$ | 1.8 | 1.9 | 0.0 | 1.5 | 1.5 |
| Glycol ether (GE) | — | — | — | a | — |
| GE/Ti mol ratio | — | — | — | 0.3 | — |
| Polymerization vessel (4) | | | | | |
| H$_2$ conc. in gas phase mol % | 10 | 10 | 10 | 2.0 | 2.0 |
| MFR$_4$ g/10 min | 0.10 | 0.12 | 0.12 | 0.002 | 0.002 |
| Ethylene content wt % | 8.6 | 8.5 | 8.8 | 8.9 | 8.8 |
| Soluble polymer wt % | 4.9 | 4.7 | 5.0 | 3.1 | 3.0 |
| Polymerization proportion wt % | 13.4 | 13.3 | 13.5 | 14.1 | 13.8 |

TABLE 1-4

| Polymerization Conditions and Results | Example 8 | → 9 | Comp. ex. ⑪ | → ⑫ |
|---|---|---|---|---|
| Polymerization vessel (1) | | | | |
| Temperature °C. | 70 | 70 | 70 | 70 |
| Pressure kg/cm$^2$G | 6 | 6 | 6 | 6 |
| H$_2$ conc. in gas phase mol % | 5.1 | 5.1 | 5.1 | 5.1 |
| MFR$_1$ g/10 min | 26.0 | 24.8 | 25.1 | 24.4 |
| Polymerization proportion wt % | 34 | 35 | 34 | 35 |
| Polymerization vessel (2) | | | | |
| Temperature °C. | 70 | 70 | 70 | 70 |
| Pressure kg/cm$^2$G | 8 | 8 | 8 | 8 |
| H$_2$ conc. in gas phase mol % | 0.71 | 0.74 | 0.72 | 0.73 |
| MFR$_2$ g/10 min | 1.3 | 1.0 | 1.2 | 0.98 |
| Polymerization proportion wt % | 34 | 33 | 34 | 32 |
| Polymerization vessel (3) | | | | |
| Temperature °C. | 70 | 70 | 70 | 70 |
| Pressure kg/cm$^2$G | 10 | 10 | 10 | 10 |
| H$_2$ conc. in gas phase mol % | 0.088 | 0.081 | 0.082 | 0.079 |
| MFR$_3$ g/10 min | 0.042 | 0.031 | 0.036 | 0.029 |
| Polymerization proportion wt % | 32 | 32 | 32 | 33 |
| log MFR$_1$/MFR$_2$ | 1.3 | 1.4 | 1.3 | 1.4 |
| log MFR$_2$/MFR$_3$ | 1.5 | 1.5 | 1.5 | 1.5 |
| Glycol ether (GE) | a | a | a | a |
| GE/Ti mol ratio | 0.1 | 0.6 | 1.5 | 0.005 |
| Polymerization vessel (4) | | | | |

TABLE 1-4-continued

| Polymerization Conditions and Results | Example 8 | → 9 | Comp. ex. ⑪ | → ⑫ |
|---|---|---|---|---|
| $H_2$ conc. in gas phase mol % | 2.0 | 2.0 | 2.0 | 2.0 |
| $MFR_4$ g/10 min | 0.001 | 0.002 | — | 0.002 |
| Ethylene content wt % | 8.7 | 9.0 | — | 8.9 |
| Soluble polymer wt % | 2.8 | 3.4 | — | 3.0 |
| Polymerization proportion wt % | 13.1 | 14.1 | — | 13.8 |

TABLE 1-5

| Polymerization Conditions and Results | Example 10 | → 11 | → 12 | → 13 |
|---|---|---|---|---|
| Polymerization vessel (1) | | | | |
| Temperature °C. | 70 | 70 | 70 | 70 |
| Pressure kg/cm²G | 6 | 6 | 6 | 6 |
| $H_2$ conc. in gas phase mol % | 5.1 | 5.1 | 5.1 | 5.1 |
| $MFR_1$ g/10 min | 26.1 | 25.3 | 24.9 | 25.4 |
| Polymerization proportion wt % | 34 | 36 | 35 | 34 |
| Polymerization vessel (2) | | | | |
| Temperature °C. | 70 | 70 | 70 | 70 |
| Pressure kg/cm²G | 8 | 8 | 8 | 8 |
| $H_2$ conc. in gas phase mol % | 0.70 | 0.72 | 0.73 | 0.71 |
| $MFR_2$ g/10 min | 0.97 | 1.1 | 1.0 | 1.2 |
| Polymerization proportion wt % | 33 | 32 | 34 | 33 |
| Polymerization vessel (3) | | | | |
| Temperature °C. | 70 | 70 | 70 | 70 |
| Pressure kg/cm²G | 10 | 10 | 10 | 10 |
| $H_2$ conc. in gas phase mol % | 0.082 | 0.084 | 0.081 | 0.079 |
| $MFR_3$ g/10 min | 0.033 | 0.035 | 0.031 | 0.042 |
| Polymerization proportion wt % | 33 | 32 | 31 | 33 |
| log $MFR_1/MFR_2$ | 1.4 | 1.4 | 1.4 | 1.3 |
| log $MFR_2/MFR_3$ | 1.5 | 1.5 | 1.5 | 1.5 |
| Glycol ether (GE) | b | c | d | e |
| GE/Ti mol ratio | 0.3 | 0.3 | 0.3 | 0.3 |
| Polymerization vessel (4) | | | | |
| $H_2$ conc. in gas phase mol % | 2.0 | 2.0 | 2.0 | 2.0 |
| $MFR_4$ g/10 min | 0.001 | 0.001 | 0.002 | 0.002 |
| Ethylene content wt % | 8.8 | 8.6 | 8.8 | 8.9 |
| Soluble polymer wt % | 2.9 | 3.2 | 3.1 | 2.8 |
| Polymerization proportion* wt % | 13.2 | 13.5 | 13.6 | 13.0 |

TABLE 2-1

| Physical properties of polymer | Example 1 | Comp. ex. ① | → ② | → ③ | Example 2 | → 3 | → 4 | Comp. ex. ④ |
|---|---|---|---|---|---|---|---|---|
| MFR of pellet g/10 min | 0.36 | 0.38 | 0.43 | 0.45 | 0.22 | 0.36 | 0.56 | 0.44 |
| Thickness of sheet μ | 394 | 402 | 398 | 403 | 396 | 405 | 394 | 397 |
| Young's modulus kgf/mm² | 98 | 95 | 96 | 97 | 94 | 95 | 96 | 97 |
| Heating behavior | | | | | | | | |
| Sagged quantity mm | 21 | 31 | 30 | 27 | 18 | 19 | 24 | 28 |
| Max. reverted quantity % | 100 | 85 | 90 | 93 | 100 | 100 | 100 | 96 |
| Retention time sec. | 32 | 13 | 15 | 17 | 35 | 37 | 21 | 16 |
| Punching high-impact strength kgf/mm² | | | | | | | | |
| 23° C. | >30 | >30 | >30 | >30 | >30 | >30 | >30 | >30 |
| 0° C. | >30 | >30 | >30 | >30 | >30 | >30 | >30 | >30 |
| −20° C. | 16 | 14 | 12 | 15 | 21 | 17 | 11 | 13 |
| Appearance of sheet | Good | → | → | → | → | → | → | → |

TABLE 2-2

| Physical properties of polymer | Comp. ex. ⑤ | → ⑥ | → ⑦ | → ⑧ |
|---|---|---|---|---|
| MFR of pellet g/10 min | 0.55 | 0.38 | 0.29 | 0.26 |
| Thickness of sheet μ | 401 | 403 | 395 | 401 |
| Young's modulus kgf/mm² | 93 | 95 | 94 | 96 |
| Heating behavior | | | | |
| Sagged quantity mm | 29 | 28 | 22 | 29 |
| Max. reverted quantity % | 93 | 96 | 100 | 95 |
| Retention time sec. | 16 | 18 | 32 | 17 |
| Punching high-impact strength kgf/mm² | | | | |
| 23° C. | >30 | >30 | >30 | >30 |
| 0° C. | >30 | >30 | >30 | >30 |
| −20° C. | 12 | 16 | 8 | 17 |
| Appearance of sheet | Good | → | Many FEs | Good |

TABLE 2-3

| Physical properties of polymer | Example 5 | → 6 | Comp. ex. ⑨ | Example 7 | Comp. ex. ⑩ | Example 8 | → 9 |
|---|---|---|---|---|---|---|---|
| MFR of pellet g/10 min | 0.30 | 0.33 | 0.31 | 0.42 | 0.42 | 0.43 | 0.39 |
| Thickness of sheet μ | 394 | 392 | 404 | 400 | 406 | 408 | 403 |
| Young's modulus kgf/mm² | 118 | 121 | 120 | 93 | 95 | 97 | 96 |
| Heating behavior | | | | | | | |
| Sagged quantity mm | 20 | 19 | 27 | 21 | 22 | 23 | 21 |

TABLE 2-3-continued

| | Example 5 | → 6 | Comp. ex. ⑨ | Example 7 | Comp. ex. ⑩ | Example 8 | → 9 |
|---|---|---|---|---|---|---|---|
| Max. reverted quantity % | 100 | 100 | 95 | 100 | 100 | 100 | 100 |
| Retention time sec. | 38 | 40 | 18 | 31 | 32 | 29 | 34 |
| Punching high-impact strength kgf/mm² | | | | | | | |
| 23° C. | >30 | >30 | >30 | >30 | >30 | >30 | >30 |
| 0° C. | >30 | >30 | >30 | >30 | 22 | >30 | >30 |
| −20° C. | 12 | 12 | 13 | 25 | 7 | 21 | 28 |
| Appearance of sheet | Good | → | → | → | Many FEs | Good | → |

TABLE 2-4

| | Comp. ex. ⑪ | → 12 | Example ⑩. | → 11 | → 12 | → 13 | → 14 | Comp. ex. ⑬ |
|---|---|---|---|---|---|---|---|---|
| MFR of pellet g/10 min | — | 0.38 | 0.34 | 0.39 | 0.31 | 0.44 | 0.32 | 0.31 |
| Thickness of sheet μ | — | 401 | 404 | 398 | 396 | 403 | 395 | 397 |
| Young's modulus kgf/mm² | — | 94 | 96 | 94 | 96 | 95 | 84 | 83 |
| Heating behavior | | | | | | | | |
| Sagged quantity mm | — | 22 | 20 | 23 | 21 | 21 | 18 | 25 |
| Max. reverted quantity % | — | 100 | 100 | 100 | 100 | 100 | 100 | 100 |
| Retention time sec. | — | 32 | 35 | 30 | 33 | 31 | 47 | 24 |
| Punching high-impact strength kgf/mm² | | | | | | | | |
| 23° C. | — | >30 | >30 | >30 | >30 | >30 | >30 | >30 |
| 0° C. | — | >30 | >30 | >30 | >30 | >30 | >30 | >30 |
| −20° C. | — | 12 | 26 | 24 | 29 | 24 | 21 | 21 |
| Appearance of sheet | — | FE present | Good | → | → | → | → | → |

What we claim is:

1. A process for continuously producing a high-melt viscoelastic ethylene-propylene copolymer by the use of a Ziegler-Natta type polymerization catalyst, which comprises the steps of
   (a) establishing a sequential series of at least three polymerization vessels, which together constitute a first polymerization stage, wherein the temperature is in the range of 20°-100° C. and the pressure is in the range of atmospheric to 50 Kg/cm² G,
   (b) feeding the total quantity of the polymerization catalyst to be used into the first polymerization vessel of the seqential series set forth in (a),
   (c) in said first polymerization stage introducing a feed of
      (1) propylene, or
      (2) propylene and ethylene wherein the ethylene constitutes less than 5% by weight of the total weight of the propylene and ethylene,
   (d) introducing hydrogen gas into only the first polymerization vessel of said first polymerization stage as a molecular weight modifier, the gas phase hydrogen concentration
      (1) in the first of said three polymerization vessels, is 2.0-14.5 mol %,
      (2) in the second of said three polymerization vessels is 0.35-0.73 mol % and
      (3) in the third of said three polymerization vessels is 0.042 to 0.10 mol %,
   (e) passing the polymerization products as well as unreacted catalyst, unreacted monomers and hydrogen in sequence through the sequential series of three polymerization vessels set forth in (a),
   (f) establishing a second polymerization stage comprising at least one polymerization vessel,
   (g) introducing the polymerization products reaction mixture and residual catalyst from said first polymerization stage into said second polymerization stage,
   (h) also introducing into said second polymerization stage
      (1) ethylene, or
      (2) ehtylene and propylene wherein the ethylene constitutes between 10 and 100% by weight of the total weight of ethylene and propylene
   said second polymerization stage being carried out at a temperature of 20°-80° C. and under a pressure of 0-50 Kg/cm² G,
   (i) the quantity of the polymer obtained in said first polymerization stage being 60 to 95% by weight on the total polymers obtained by the process,
   (j) in said first polymerization stage, the polymerization quantities in said at least three polymerization vessels conforming with the following expression $$0.70 \times \frac{Q_T}{n} \leq Q_i \leq 1.30 \frac{Q_T}{n}$$

wherein $$\sum_{i=1}^{n} Q_i = Q_T = 1,$$

$Q_T$: the total polymerization quantity per unit time in the first polymerization stage is made 1,
i: polymerization zone i-numbered from the first,
$Q_i$: polymerization quantity per unit time in the polymerization vessel i-numbered from the first,
n: the number of polymerization vessel used in the first polymerization stage, (k) the pressure in each of said at least three polymerization vessels in (a) are kept so as to be not less than 2 KG/cm$^2$ G or lower than the pressure in the preceding polymerization vessel, (l) the polymerization temperature in each of said at least three polymerization vessels are kept so as to not be more than 10° C. higher than the temperature in the preceding polymerization vessel, (m) the Ziegler-Natta type catalyst comprises an organoaluminum compound component (B) combined with a titanium-containing solid component (A) to form a compound expressed by the formula AlR$^2{}_m$X$_{3-m}$ wherein R$^2$ represents a hydrocarbon group of 1 to 20 carbon atoms, X represents a halogen atom and m represents a number of $3 \geq m \geq 1.5$, (n) said first polymerization stage is carried out in the presence of an inert solvent or liquid propylene, and (o) a glycol ether is continuously added to the polymerization reaction mixture after the completion of the first polymerization stage so as to give a ratio (mol/atom) of said glycol ether to Ti in said (A) of 0.01 to 1.0 while carrying out the polymerization stage.

2. A continuous process according to claim 1 wherein in said first polymerization stage the molecular weights of the polymers formed in the three polymerization vessels, in terms of MFR values, fall within the range of the expression $$\log \frac{MFR_i}{MFR_{i+1}} \geq 1.0$$

wherein
MFR$_i$: MFR of the polymer formed in the polymerization vessel i-numbered from the first
MFR$_{i+1}$: MFR of the polymer formed in the polymerization vessel i+1=numbered from the first.

* * * * *